(12) United States Patent
Kozyuk

(10) Patent No.: US 9,963,560 B2
(45) Date of Patent: May 8, 2018

(54) PROCESS FOR DISPERSING PARTICLES IN FILLED RESIN COMPOSITIONS

(71) Applicant: ARISDYNE SYSTEMS, INC., Cleveland, OH (US)

(72) Inventor: Oleg Kozyuk, North Ridgeville, OH (US)

(73) Assignee: ARISDYNE SYSTEMS, INC., Cleaveland, OH (US)

( * ) Notice: Subject to any disclaimer, the term of this patent is extended or adjusted under 35 U.S.C. 154(b) by 293 days.

(21) Appl. No.: 14/876,512

(22) Filed: Oct. 6, 2015

(65) Prior Publication Data

US 2016/0122479 A1 May 5, 2016

Related U.S. Application Data

(60) Provisional application No. 62/072,102, filed on Oct. 29, 2014.

(51) Int. Cl.

| | |
|---|---|
| *C08J 3/20* | (2006.01) |
| *C08K 3/22* | (2006.01) |
| *C08K 3/08* | (2006.01) |
| *H01B 1/22* | (2006.01) |
| *C08J 3/12* | (2006.01) |
| *B29B 7/00* | (2006.01) |
| *B29B 7/90* | (2006.01) |
| *B29B 7/10* | (2006.01) |
| *B29B 7/74* | (2006.01) |

(52) U.S. Cl.
CPC ............... *C08J 3/203* (2013.01); *B29B 7/005* (2013.01); *B29B 7/90* (2013.01); *C08J 3/12* (2013.01); *C08K 3/08* (2013.01); *C08K 3/22* (2013.01); *H01B 1/22* (2013.01); *B29B 7/10* (2013.01); *B29B 7/7461* (2013.01); *C08J 2363/00* (2013.01); *C08J 2363/02* (2013.01); *C08J 2379/08* (2013.01); *C08K 2003/0806* (2013.01); *C08K 2003/2227* (2013.01)

(58) Field of Classification Search
None
See application file for complete search history.

(56) References Cited

U.S. PATENT DOCUMENTS

| | | | |
|---|---|---|---|
| 5,116,561 A | 5/1992 | Kagawa | |
| 2004/0082688 A1 | 4/2004 | Kagawa | |
| 2008/0184914 A1* | 8/2008 | Shen | B82Y 30/00 |
| | | | 106/476 |
| 2010/0276638 A1* | 11/2010 | Liu | B82Y 30/00 |
| | | | 252/301.35 |

FOREIGN PATENT DOCUMENTS

| | | |
|---|---|---|
| JP | 2007-098689 A | 4/2007 |
| JP | 2008-542517 A | 11/2008 |
| JP | 2014-185203 A | 10/2014 |

OTHER PUBLICATIONS

International Search Report and Written Opinion issued in corresponding International PCT Application No. PCT/US2015/054269; dated Dec. 22, 2015.

* cited by examiner

*Primary Examiner* — Tanisha Diggs
(74) *Attorney, Agent, or Firm* — Pearne & Gordon LLP

(57) ABSTRACT

An improved process for dispersing filler particles in a resin composition is disclosed. The filler particles, for instance electrically conductive or metal particles, are mixed with a resin material or blend of materials including a resin material to form a mixture that is subjected to an acceleration force. The acceleration force can be generated by passing the mixture through a static nozzle having particular dimensions to generate an acceleration of the mixture in the nozzle in excess of 400,000 m/sec$^2$. The treated particles become uniformly dispersed in the resin composition and a reduction in average particle size of the filler material can be achieved.

15 Claims, 1 Drawing Sheet

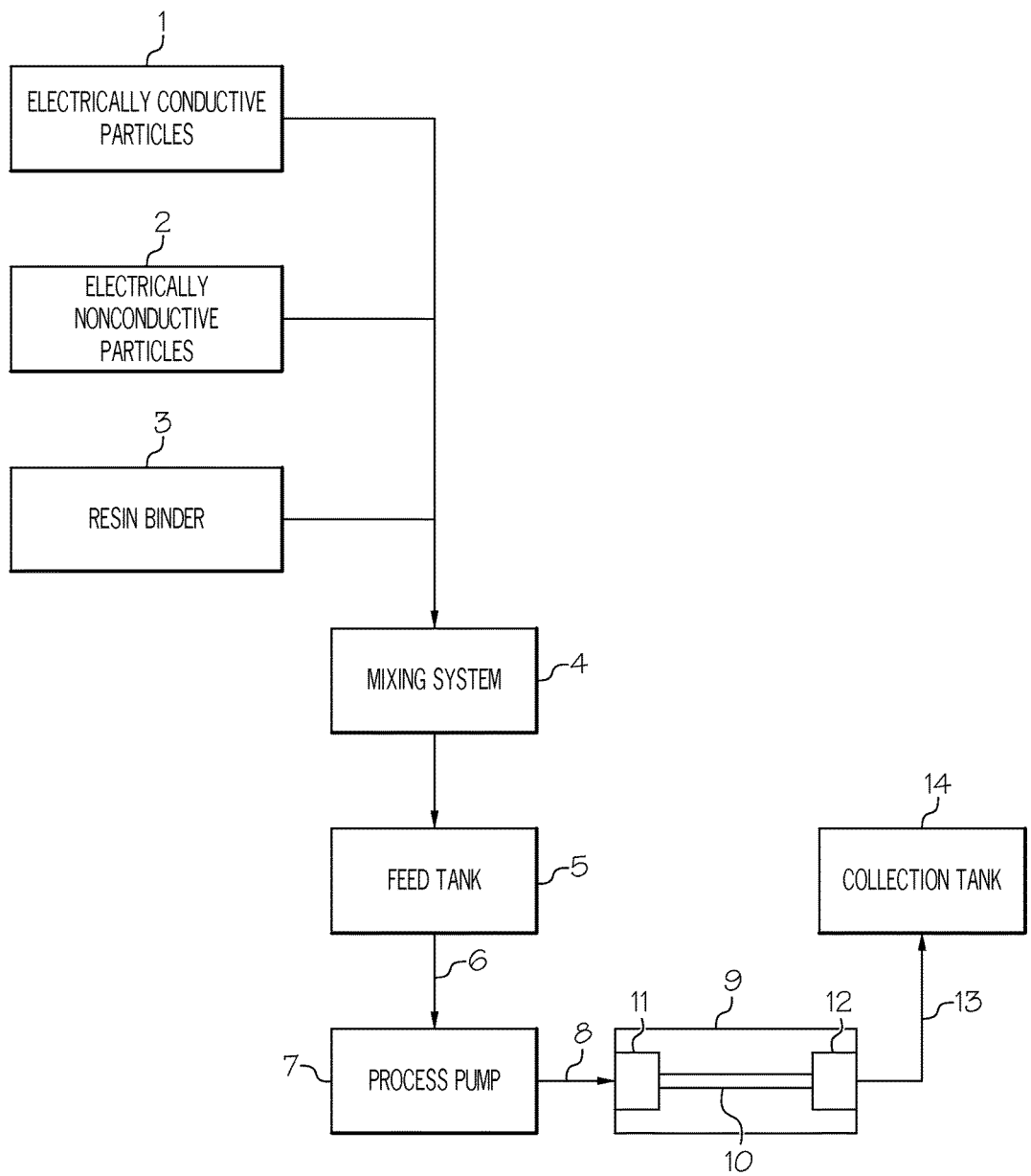

PROCESS FOR DISPERSING PARTICLES IN FILLED RESIN COMPOSITIONS

This application claims the benefit of U.S. provisional application Ser. No. 62/072,102 filed Oct. 29, 2014, the contents of which are incorporated herein in their entirety by reference.

FIELD

The present disclosure relates to processes for dispersing particles of a filler material in a resin to form a filled resin composition, and more particularly, improved processes for dispersing and reducing particle sizes of particles of filler material for the formation of filled resin compositions.

BACKGROUND

As the miniaturization of electric devices progresses, it is desirable to provide more compact electronic components, such as inductors, capacitors, and filters, for use in such electronic devices. To maintain electronic characteristics and to achieve further miniaturization of electronic components, a conductive filler is needed to have a smooth surface with no pinholes. And metal particles in the conductive composition are also advantageously reduced in size to result in higher dispersion. Aggregated metal particles and deformed metal particles in the conductive composition or paste that forms internal electrodes of ceramic multilayer components may cause electric defectives, such as short circuiting. Particularly, in thin-film, multilayer electronic components, it is beneficial for metal particles to be reduced in size for providing higher dispersion. When the particle size of the aggregated metal particles becomes larger than film thickness of the internal electrodes, ceramics between the internal electrodes are greatly stressed, resulting in a marked reduction in the reliability and a lower yield of the ceramic laminated component.

Conventionally, methods to disperse metal powders into a resin carrier and an organic solvent can include using equipment such as Laikai machine (a mixing and grinding machine), a triple roller or a ball mill, and a collision dispersion method which high pressure slurries collide among themselves. The collision dispersion method is disclosed in Japanese Patent Unexamined Publication 9-201521, Japanese Patent Unexamined Publication 9-299774, Japanese Patent Unexamined Publication 10-57789, PCT publication WO 00/04559, Japanese Patent Unexamined Publication 10-887457 and Japanese Patent Unexamined Publication 11-1460511.

However, the media used in the dispersion treating method, when the metal particles are submicron or less, or when the metal particles are firmly aggregated, suffers from a problem of not being able to make the metal particles ultra-fine and disperse the particles uniformly. A further drawback is excess action of media in deforming the metal particles.

Moreover, collision dispersion method, after a drying step, has its limit for firmly aggregated metal particles to be sufficiently crushed and to be uniformly dispersed. And to disperse the firmly aggregated metal particles to a certain extent, lengthy treatment is required along with an increase in required energy. Accordingly, poor efficiency and increased production costs result from such a method.

SUMMARY

A process for dispersing particles in a filled resin composition that includes the step of combining filler particles with a resin material to form a mixture. The mixture is passed at least once through a nozzle to subject the mixture to an acceleration force condition that results in an acceleration (A) of the mixture through the nozzle equal to or greater than 400,000 m/sec² to form a dispersed particle mixture.

The acceleration of the mixture in the nozzle can be calculated by the equation $$A=(V_2-V_1)/t,$$

where $V_1$ is the velocity of the mixture at the entrance of the nozzle, $V_2$ is the velocity of the mixture at the exit of the nozzle, and t is the time duration of the mixture in the nozzle.

In one embodiment, the process can include the nozzle having an axial length to diameter ratio in the range of 0.4:1 to 3:1. In regard to axial length of the nozzle, it can be the case that the nozzle has a constant or uniform diameter along its length. The nozzle diameter can be referred to as the average diameter of the nozzle along its length for calculating acceleration of the mixture in the nozzle. In another embodiment, the nozzle can have an axial length of no more than 3 times the average diameter of the nozzle.

In another embodiment, the nozzle can be selected to have a circular, elliptical, rectangular, annular, polygonal or slit-like cross section.

In yet another embodiment, the filler particles used to make the mixture can have a first average diameter and the filler particles exiting the nozzle can have a second average diameter, wherein the second average diameter of the filler particles is at least 80, 85 or 90 percent less than the first average diameter of the filler particles. In another example, the mixture can have starting filler particles having a first average diameter and the final dispersed filled resin composition, e.g., the mixture being passed through the nozzle once or multiple times as described herein, can have a second average diameter, wherein, the second average diameter of the filler particles in the final filled resin composition is at least 80, 85 or 90 percent less than the first average diameter of the starting filler particles.

The process can further include passing the mixture through the nozzle multiple times, for example, by recirculating the mixture through the nozzle repeatedly. For example, the mixture can be passed through the nozzle at least 3 times to achieve an improved dispersion and/or reduction in average size of the particles in the resin composition.

In an embodiment, the process can result in the average diameter of the filler particles having an ending size less than 5 microns, or less than 1 micron.

The filler particles of the mixture can be electrically conductive particles selected from the group consisting of metals, alloys, metal on metal composites, and metal on nonmetal composites, conductive oxides, conductive polymers, carbons, and combinations thereof.

In another instance, the filler particles can contain electrically non-conductive particles selected from the group consisting of metal oxides, metal nitride, metal carbides, metal silicates, metal titanates, glasses, and combinations thereof.

In yet another embodiment, the filler particles can contain at least one particle selected from the group consisting of silver, gold, platinum, copper, nickel, aluminum, gold coated nickel, silver coated nickel, silver coated aluminum, metallic coated glass spheres, nano silver particles, nano copper particles, nano nickel particles, nano-silver coated particles, graphite-coated particles, carbon nanotubes, conductive oxides, and combinations thereof.

The resin in the mixture can include a material selected from the group consisting of polyesters, polyurethanes, polyamides, phenoxy resins, polyacrylates, vinyl-containing resins, epoxies, acrylics and acrylates, silicones, maleimides, and cyanate esters, silicones, and combinations thereof.

In one embodiment, the filler particles of the mixture can be present as 30 to 95 percent by weight. The remainder of the mixture can be resin or a combination of resin and other components.

The process can further include adding a portion of the filler particles into the mixture after a portion of the mixture has been passed through the nozzle. For example, additional particles can be combined with the dispersed particle mixture and then recirculating the dispersed particle mixture containing the additional filler particles through the nozzle.

In yet another embodiment, the acceleration of the mixture in the nozzle can be greater than 800,000 m/sec$^2$ and the nozzle having an axial length to diameter ratio in the range of 0.4:1 to 1:1.

BRIEF DESCRIPTION OF THE DRAWINGS

FIG. 1 shows a block flow diagram of a filler material dispersing process utilizing a nozzle to subject the mixture of resin and particles to an acceleration force.

DETAILED DESCRIPTION

Herein, when a range such as 5-25 (or 5 to 25) is given, this means preferably at least 5 and, separately and independently, preferably not more than 25. In an example, such a range defines independently not less than 5, and separately and independently, not less than 25.

A process has been discovered for an efficient, cost-effective way to disperse filler material in a resin containing composition. The process can further deagglomerate or reduce the particle size of the filler material to facilitate improved mixing and dispersion. It has been found that an acceleration force of at least 400,000 m/sec$^2$ in a nozzle can effectively disperse and regulate the particle size of filler material in a resin composition.

The sharp acceleration at the nozzle entry results in high macroscale elongation rates and a pressure gradient stress. High acceleration rates and radial velocity gradients inside the nozzle lead to high turbulent energy dissipations rates and a macroscale shear deformation. Within the entrance region, the pressure gradient, shear and elongational stresses reach their maximum. The acceleration forces cause filler inter-particle collisions, compression, erosion, and shear under hydrodynamic, compressive, and elongational stresses and produce fragmentation and disintegrating interaction between said particles to effectively disperse the particles in the mixture and/or deagglomerate or reduce the size of the particles for improved mixing. Thus, the present disclosure allows for preparation of filled resin systems without requiring preprocessing in media mills or pre-filtration.

The process for dispersing particles in filled resin compositions according to the present disclosure can include a first step of combining at least one filler particle and a resin to form a mixture and a second step of dispersing the filler particles in the resin composition by subjecting the mixture to an acceleration force.

As used in this specification and claims, filled resin compositions means a composition of at least one resin material, e.g., organic monomers, oligomers, polymers, or a combination of any of these, loaded with one or more filler particles or blends of filler particles. The filled resin compositions can include additional components as known in the art or can be composed of only resin material and filler particles.

Suitable resin for use in these compositions can include, for example, epoxies, maleimides (including bismaleimide), acrylates and methacrylates, and cyanate esters, vinyl ethers, thiol-enes, compounds that contain carbon to carbon double bonds attached to an aromatic ring and conjugated with the unsaturation in the aromatic ring (such as compounds derived from cinnamyl and styrenic starting compounds), fumarates and maleates. Other exemplary compounds can include polyamides, phenoxy compounds, benzoxazines, polybenzoxazmes, polyether sulfones, polyimides, siliconized olefins, polyolefins, polyesters, polystyrenes, polycarbonates, polypropylenes, polyvinyl chloride)s, poly-isobutyienes, polyvinyl acetate)s, cis-1,4-polyisoprenes, 3,4-polychloroprenes, vinyl copolymers, poly(ethylene oxide)s, poly(ethylene glycol)s, polyforrnaldehydes, polyacetaldehydes, poly(b-propiolacetone)s, poly(ethylene terephthalate)s, polycaprolactams, poly (11-undecanoamide)s, poly(m-phenylene-terephthalamide)s, poly(tetramethlyene-m-benzenesulfonamide)s, polyester polyarylates, poly (phenylene oxide)s, poly(sulfone)s, polyetherketones, polyimide siloxanes, poly-isoindolo-qmnazolinediones, polythioetherimide poly-phenyl-quinoxalmes, polyquinixalones, imide-aryl ether phenylquinoxaline copolymers, polyquinoxalines, polybenzimidazoles, polybenzoxazoles, polynorbornenes, poly(arylene ethers), polysilanes, parylenes, benzocyclobutenes, hydroxyl-(benzoxazole) copolymers, and poly(silarylene siloxanes), or any combination of the above resin compounds.

Suitable epoxy resins include, but are not limited to, bisphenol, naphthalene, and aliphatic type epoxies. Commercially available materials include bisphenol type epoxy resins (Epiclon 830LVP, 830CRP, 835LV, 850CRP) available from Dainippon Ink & Chemicals, Inc.; naphthalene type epoxy (Epiclon HP4032) available from Dainippon ink & Chemicals, Inc.; aliphatic epoxy resins (Araldite CY179, 184, 192, 175, 179) available from Ciba Specialty Chemicals, (Epoxy 1234, 249, 206) available from Dow Corporation, and (EHPE-3150) available from Daicel Chemical Industries, Ltd. Other suitable epoxy resins include cycloaliphatic epoxy resins and dicyclopen-tadienephenol type epoxy resins or combination of the above resins.

Other suitable resins can include, for example, vinyl ether resins that can contain vinyl ether functionality, which can include poly(butadienes), poly(carbonates), poly(urethanes), poly(ethers), poly(esters), simple hydrocarbons, and simple hydrocarbons containing functionalities such as carbonyl, carboxyl, amide, carbamate, urea, ester, or ether or combinations thereof.

The filled resin compositions may also include a curing agent or catalyst for any of the resins present in the compositions. Whether or not the curing agent or catalyst is added to the resin compositions before, after or during the dispersing process is at the discretion of the practitioner.

The curing agent (or catalyst) can be either a free radical initiator or an ionic initiator (either cationic or anionic), depending on whether a radical or ionic curing resin is chosen. The type and amount of curing agent required for a particular resin composition can be determined by those skilled in the art. In some cases, it may be desirable to use more than one type of cure, for example, both ionic and free radical initiation, in which case both free radical cure and ionic cure resins can be used in the composition. Such a composition would permit, for example, the curing process to be started by cationic initiation using UV irradiation, and in a later processing step, to be completed by free radical initiation upon the application of heat. Such curing processes can be carried out in the resin composition subsequent to or during filler particle dispersion.

The filler particles can be organic or inorganic, conductive or non-conductive, and can be in any size (for example, nano or micron) or shape, (for example, particles, powders, flakes or platelets). The starting filler particles for mixing with the resin can have an average diameter in the range of 5 micron to 10, 20, 50, 100, 250, 500 or more microns. In another embodiment, the filler particles can be of any appropriate size ranging from nano size to several mm. The choice of such size for any particular end use is within the expertise of one skilled in the art. Filler particles may be present in the mixture with resin or the filled resin composition in an amount from 30 to 95 percent by weight of the total composition or mixture. For example, the filler particles can be present in a loading amount of more than 35, 40, 45, 50, 55, 60, 65 or 70 percent by weight of the total composition or mixture. More than one filler type may be used in a composition or mixture and the fillers may or may not be surface treated. Appropriate filler sizes can be determined by the practitioner for the end use application.

To produce an electrically conductive filled resin composition, the filler particles can be or include at least one metal selected from among silver, gold, platinum, copper, nickel, aluminum, gold or silver coated nickel, silver coated aluminum, metallic coated glass spheres, nano silver, nano copper, nano nickel, other nano-silver coated fillers, graphite-coated fillers, carbon nanotubes, conductive oxides, and/or any combination thereof.

The filled resin compositions can include filler particles that are electrically non-conductive. Examples of suitable non-conductive filler particles include alumina, alumina oxide, aluminum hydroxide, vermiculite, mica, calcium carbonate, titanium, barium sulfate, zirconium, silicon carbide, boron nitride, amorphous silica, ground quartz, aluminum nitride, glass, zinc oxide, zirconium oxide, barium titanate, zirconium silicate, carbon fiber, carbon nanotubes, zirconium tungstate, fumed silica, bentonite, laponite, needle shaped zinc, silicon, semiconductive doped oxides such as zinc tin oxide, zeolite, calcium oxide, silica gel, magnesium sulfate, sodium sulfate, calcium chloride, magnesium chloride, barium oxide, potassium oxide, calcium hydride, silicon carbide, and combinations thereof.

Other electrically non-conductive can include at least one of metal oxides, metal nitride, metal carbides, metal silicates, metal titanates, glasses and/or any combination thereof.

Conventionally, filler particles have been prepared by various methods such as by co-precipitation in aqueous solutions, electrochemical methods, reverse microemulsion, chemical liquid deposition, photochemical reduction, and chemical reduction and UV irradiation. All of these methods have limitations in controlling the particle size of the filler and in production on an industrial scale. Metal particles manufactured via conventional methods are commonly in the form of aggregated powder, or they tend to readily agglomerate and even irreversibly agglomerate. Such agglomeration requires a separation process which, as a result, causes a problem in controlling the particle size distribution in a desired range.

Examples of uses for filled resin compositions include the manufacture of internal electrodes, for instance, in multi-layer capacitors, interconnections in multi-chip components, conductive lines in auto defoggers/deicers, photovoltaic modules, resistors, inductors, antennas and membrane switches, electromagnetic impulse shielding (such as in cellular telephones), thermally conductive films, light reflecting films, conducting adhesives, electrical interconnections within electronic products, grids or conductive tracks for collecting or distributing electrical current or heating. The present disclosure can be useful for preparing filled resin compositions for use in any of the noted applications.

Areas in which filled resin compositions may be used include die attach, component attach, multilayered ceramic capacitors (MLCC), conductive tracks, radiofrequency identification devices (RFID), polymer thick films, electromagnetic impulse (EMI) shielding, static charge dissipation, photo voltaics, display transparent electrodes, conductive traces for heating applications, conductive inks, printable electronic applications; surface coatings for windows in houses, automobiles, or appliances to reflect solar heat and to aid cooling or to reflect infrared radiation; thermal interface materials; and transparent electrically conductive compositions, conductive adhesives, coatings, or encapsulants. The present disclosure can be useful for preparing filled resin compositions for use in any of the noted areas.

In addition to the above applications and areas, electrically conductive compositions of the present disclosure including resin and filler particles may be used for disinfecting or sterilizing substrates, catalyzing chemical reactions, chemically or mechanically polishing surfaces, and for removing static charge from substrates.

One embodiment of a process for dispersing filler particles in a resin composition can include the use of a nozzle device to apply an acceleration force to a mixture containing resin and filler particles. The acceleration is applied to the mixture by at least one static nozzle device, for example, a nozzle device selected from the group consisting of static mixers, valve, orifice plates, perforated plates, venturis, jet mixers, jet dispergator, opposed jet-equipped mixing chambers, microfluidizer and high pressure homogenizer nozzle.

A high pressure homogenizer nozzle can employ a high pressure homogenizer selected from the group consisting of an Avestin homogenizer, a Niro homogenizer, a Rannie homogenizer, a Gaulin homogenizer, Bee homogenizer, counter flow homogenizer, a homogenizer comprising of a homogenizing nozzle or orifice made of ceramic materials, and a homogenizer comprising of a homogenizing nozzle or orifice made of diamond and other hard materials.

A wide variety of nozzle devices which are suitable to perform acceleration steps can be used for the process provided herein. For example, devices disclosed in U.S. Pat. Nos. 1,496,858; 4,127,332; 4,996,004; 5,116,536; 5,147,412 and 5,931,771 may be used to perform the process and are herein incorporated by reference. Optionally it may be useful to employ nozzle dispersing machines in which several nozzles are arranged in succession, for example a series of 2, 3, 4 or 5, so that the material or mixture is passed through a nozzle for applying acceleration forces several times within a short period of time. In another example, the mixture or material can be recirculated through a single nozzle device or multiple nozzle devices arranged in series as noted above.

As illustrated in the diagram of FIG. 1, one embodiment of the process for dispersing filler particles in a resin composition can include combining one or more types of filler particles to a resin material. As shown, product or mixture components are supplied from sources 1, 2 and 3 into a mixing system 4. For simplicity, only three types of components are shown by way of example: filler particles 1 and 2, and a resin 3; but a wide variety of other components, or more than three components, could be used depending on the product to be made. Alternatively, the mixture can only be made up of resin material or a blend of resin materials and one type of filler particles, for example, electrically conductive or non-conductive particles. As illustrated, electrically conductive particles 1 and electrically non-conductive particles 2 are combined with a resin binder 3 to yield a 3-component mixture.

The mixing system 4 is of a suitable kind (e.g. propeller mixer, planetary mixer, colloid mill, etc.) for the type of product. After mixing 4, the mixed components can be fed into a feed tank 5. In some cases, the mixing may be performed inside feed tank 5, for example, with a feed tank 5 equipped with an internal stirrer or mixer or with a recirculation loop including a transfer pump. The mixture of 1, 2 and 3 preferably contains up to about 30-95% by weight filler particles 1 and 2, or alternatively either only 1 or 2. To make up the total filler particle component, the filler particles 1 and 2 can be in a ratio of 5:95 or 95:5 respectively. The maximum content of particles that is reasonably processable may be partially dependent on the type of particles being processed and/or the resin binder.

The mixture from tank 5 can be transferred through line 6 to a process pump 7. The process pump 7 can be any suitable pump, for example, a positive displacement pump such as a triplex or intensifier pump, which can generate high fluid pressures. From process pump 7 the mixture flows at pressure through line 8 into nozzle device 9. Processing of the mixture takes place in nozzle device 9 where the mixture is forced through nozzle 10.

The nozzle device 9 can include an input chamber 11 in which the process mixture stream 8 enters, an output chamber 12 where the process mixture stream exits, and a nozzle 10. The nozzle device 9 can include several independent nozzles in series (not shown). As shown, the nozzle 10 can be constriction channel having an axial length between the input and output chambers 11, 12, both of which have a diameter larger than the constriction channel. The average inner diameter of the nozzle 10 is determined in part by the size of the individual particulates being processed.

The nozzle 10 (e.g., the constriction channel) can have a constant diameter along its length and, to the extent a constant diameter is not present an average diameter along its axial length can be used to calculate an acceleration force. For example, the nozzle 10 can have a diameter in the range of 0.1 mm to 50 mm, 0.15 to 10 mm, 0.2 to 5 mm or about 0.25, 0.5, 0.75, 1, 2, 3 or 4 mm. The axial length of the nozzle can be in the range of 0.1 mm to 50 mm, 0.15 to 10 mm, 0.2 to 5 mm or about 0.25, 0.5, 0.75, 1, 2, 3 or 4 mm. For preparation of filled resin compositions, the nozzle can preferably have an axial length to diameter/aperture width ratio of from 0.4:1 (0.4) to 3:1 (3), 0.5 to 2, 0.5 to 1.5 or about 0.5, 0.6, 0.7, 0.8, 0.9, 1, 1.1, 1.2, 1.3 or 1.4.

The nozzle can have a circular, elliptical, rectangular, annular, and polygonal or slit-like cross section. Following the dispersion process the dispersed particle mixture exiting the nozzle device 9 can flow through line 13 in collection tank 14. Material from the collection tank 14 can be processed through nozzle 10 repeatedly by recirculation through nozzle device 9. For example, the mixture can be passed through the nozzle 10 multiple times and in the range of 2 to 150 passes, 3 to 100 passes, 5 to 75 passes, or about 8, 10, 15, 20, 25, 30, 40 or 50 passes. Alternatively, multiple nozzle devices 9, for instance at least 2, 3 or 4 can be placed in series (not shown). The nozzle axial length to diameter/aperture width ratio of each nozzle device 9 in the series can be as specified above.

As shown, the dispersion process begins when the mixture 8 enters the nozzle cell input chamber 11 and transitions into the nozzle 10 passage. The abrupt contraction with sharp acceleration and decrease in pressure results in high macroscale elongation rates and a high hydrodynamic dispersing stress thereby causing the acceleration kinetic energy to be absorbed by the particles in the mixture. Within the acceleration region, pressure gradient, hydrodynamic and elongational stresses reach their maximum and thus the mixture flows through the nozzle 10 under very high hydrodynamic dispersing stresses. These stresses induce particle-particle interactions forces, intense forces of shear, collisions, compression, and erosion, which cause breakage, rapture, shattering of filler particles suspended in the resin into extremely small and highly uniform particles. It is believed that the rapture and shattering represent the mechanism that dominates disintegration of filler particle and agglomerates under considered process conditions. The conditions of the present disclosure result in a process that does not generate hydrodynamic cavitation in the mixture as it flows through the nozzle. For instance, the resin and filler particle mixture does not contain a cavitation bubble as it passes through the nozzle device. Preferably, the entire dispersion process can be devoid of the generation of hydrodynamic cavitation.

Acceleration of the mixture through the nozzle can be measured by observing certain parameters. As used herein, the formula for the acceleration in the nozzle 10 is: $A=(V_2-V_1)/t$.

Where $V_2$ is the velocity of the mixture at the nozzle exit (e.g. at the entry point of the output chamber), $V_1$ is the velocity of the mixture at the nozzle entrance (e.g., exiting the input chamber), and t is time duration in the nozzle 10 passage. As used in the acceleration equation, the nozzle exit is the transition area between the end or exit of the nozzle passage 10 and the beginning of the output chamber 12. Separately, the nozzle entrance is the transition area between the beginning of the nozzle passage 10 and the end or exit of the input chamber 11.

The magnitude of stresses at the nozzle entrance depends on the acceleration rate, which is affected by the width of the nozzle. To achieve the desired dispersing result (particle sizes typically are in the range of 0.01 μm to 10 μm, with preferred size ranges for different applications) in the viscous resin media, acceleration of the mixture in the nozzle (A) can be at least 400,000 m/sec$^2$. The acceleration is preferably at least 450,000, 500,000, 750,000, 1,000,000, 2,000,000, 3,000,000, 4,000,000, 5,000,000, 10,000,000 m/sec$^2$ or more.

When filler particles and agglomerates are introduced into the nozzle under these acceleration conditions, particles are stressed and deformed under the influence of the force and inertial loads until they can then break apart, deagglomerate and/or shatter. Filler particles and agglomerates according to the present disclosure exhibit good dispersibility in the resin due to the narrow particle size distribution of the particles and their low degree of agglomeration. When the filled resin compositions are used in a film and/or coating, the improved dispersion of the particles results in smoother prints and sharper print edges, and the film or coating may extend over a large area or, alternatively, the film and/or coating may be in the form of a narrow line, or pattern of fines. When spraying is used as the method of deposition, the finely dispersed particles in the filled resin compositions reduce clogging of the spray nozzle and thus an even, uniform film can be applied to a substrate.

Additionally, as a result of the superior properties of the filler particles as dispersed in the resin composition of the present disclosure, filled resin systems manufactured with such filler particles exhibit improved performance over prior art compositions.

In order to promote a further understanding of the invention, the following examples are provided. These examples are shown by way of illustration and not limitation.

EXAMPLE

Dispersion of Various Filler Particles in Epoxy Resin Using Acceleration Forces

The device used for processing the materials is disclosed in U.S. Pat. No. 5,931,771.

Filled resin compositions were prepared by separately combining the components listed in Table 1 below.

The components of each column in Table 1 were premixed in an agitator mixer for 15 minutes at atmospheric pressure to form a mixture of resin and filler particles. Premixed samples were passed multiple times through the different diameter nozzles with different acceleration rates with the use of a positive displacement pump. After processing through the nozzles, the samples were collected and analyzed.

The particle sizes of the fillers were measured by a Horiba DT-1200 Electroacoustic Spectrometer.

ment in liquid formulations (such as adhesive formulations), enhanced particle size management, and improved bond line thickness control.

The filled resin compositions or systems according to this disclosure may be substituted for compositions used in prior art electrically conductive applications without significant modification of the formulation of the compositions. Additionally, as a result of the superior properties of the filler particles of the present disclosure, electrically conductive compositions manufactured with such filler particles can exhibit improved performance over prior art compositions.

Filler particles produced by this method may be incorporated into coatings and adhesives to control/reduce coefficient of thermal expansion (CTE), control rheology, to provide barrier properties or act as desiccants or scavengers (e g sealant applications), to act as solid curing agents, catalysts or hardeners, anti-corrosion agents, pigments, dispersants, wetting agents, adhesive promoters, conductivity promoters, to provide abrasion resistance, to provide low emissivity, to provide oxide fillers and the like.

Due to the combination of small particle size and narrow particle size distribution, filler particles produced may be used in high performance adhesive and coating compositions in smaller quantities than filler particles produced by conventional methods. As shown in Table 1 above, the dispersion process can reduce the average or mean particle size of the filler particles, for example, at least 80, 85, 90 or 95 percent or more as compared to the starting average or mean filler particle size being combined with the resin material. Herein, particle size can be expressed in an average

TABLE 1

| Resin | Epoxy 1 | Epoxy 2 | Epoxy 3 | Epoxy 2 | Epoxy 4 | Bismaleimide |
|---|---|---|---|---|---|---|
| Filler Particles | Silver | Silver | Silver | Silver | Silica | Alumina |
| Filler loading, wt. % | 85.0 | 70.0 | 92.0 | 70.0 | 36.5 | 55.0 |
| Premixed samples: Mean particle size, micron | 11.86 | 12.42 | 14.35 | 13.18 | 26.30 | 17.70 |
| Nozzle diameter, mm | 0.254 | 0254 | 1.0 | 1.0 | 0254 | 0.50 |
| Nozzle axial length, mm | 0.123 | 0254 | 2.0 | 3.0 | 0254 | 0.50 |
| Nozzle axial length to diameter ratio | 0.5 | 1.0 | 2.0 | 3.0 | 1.0 | 1.0 |
| Velocity at the nozzle entrance $V_1$, m/sec | 0.07 | 0.07 | 0.12 | 0.12 | 0.068 | 0.09 |
| Velocity at the nozzle exit $V_2$, m/sec | 33.2 | 34.2 | 31.8 | 34.4 | 47.3 | 17.0 |
| Acceleration at the nozzle exit, m/sec$^2$ | $4.3 \times 10^6$ | $8.7 \times 10^6$ | $5.5 \times 10^5$ | $3.7 \times 10^5$ | $1.7 \times 10^6$ | $5.8 \times 10^5$ |
| Number passes through the nozzle | 30 | 30 | 42 | 130 | 14 | 85 |
| Processed products; Mean particle size, micron | 0.87 | 1.12 | 1.62 | 4.78 | 0.93 | 1.82 |
| Mean particle size reduction after processing, % | 92.7 | 91.0 | 88.7 | 63.7 | 96.5 | 89.7 |

Resins:
Epoxy 1: blend of Epiclon N730-A and 1,4-butanediol diglycidyl ether
Epoxy 2: bisphenol A
Epoxy 3: butyl carbitol acetate
Epoxy 4: EPALLOY 8220E
Fillers:
Silver: micron-sized flake from Metalor Technologies USA
Alumina: micro alumina from Showa Denka Specific advantages related to the use this disclosure in producing filled resin compositions and systems include low viscosity dispersions with regular or higher filler loadings, greater filler dispersion uniformity, lower diluent requirediameter of the filler particles present in any particular resin mixture or filled resin composition.

The filler particles may be single-phase or multi-phase, or composite. Multi-phase materials may be in a variety of morphological forms, for example, in an intimate mixture of two or more phases or with one phase forming a surface coating over a core including another phase.

It will be understood that this invention is not limited to the above-described embodiments. Those skilled in the art having the benefit of the teachings of the present invention as hereinabove set forth, can effect numerous modifications thereto. These modifications are to be construed as being encompassed with the scope of the present invention as set forth in the appended claims.

It will be apparent to those skilled in the art that many modifications, variations, substitutions, and equivalents for the features described above may be effected without departing from the spirit and scope of the invention as defined in the claims to be embraced thereby. A preferred embodiment has been described, herein. It will be further apparent to those skilled in the art that the above methods may incorporate changes and modifications without departing from the general scope of this invention. It is intended to include all such modifications and alteration in so far as they come within the scope of the appended claims or the equivalents thereof.

What is claimed is:

1. A process for dispersing particles in a filled resin composition comprising the steps of:
   a) combining filler particles and a resin to form a mixture, the filler particles being about 30 to 95 percent by weight of the mixture;
   b) passing the mixture through a static nozzle to subject the mixture to an acceleration force condition of A≥400,000 m/sec$^2$, where A is the acceleration of the mixture in the nozzle, to form a dispersed particle mixture,
   wherein the average diameter of the filler particles of the mixture is reduced by at least 80 percent after passing through the nozzle, wherein the mixture is passed through the nozzle in the range of 10 to 150 times,
   wherein A is calculated by the equation A=(V$_2$−V$_1$)/t, where V$_1$ is the velocity of the mixture at the entrance of the nozzle, V$_2$ is the velocity of the mixture at the exit of the nozzle, and t is the time duration of the mixture in the nozzle.

2. The process of claim 1, the filler particles of step a) having a first average diameter and the filler particles exiting the nozzle having a second average diameter, the second average diameter of the filler particles being at least 85 percent less than the first average diameter of the filler particles, wherein the mixture is passed through the nozzle in the range of 10 to 100 times.

3. The process of claim 1, the mixture being passed through the nozzle in the range of 20 to 150 times.

4. The process of claim 2, the second average diameter of the filler particles being less than 5 microns.

5. The process of claim 2, the second average diameter of the filler particles being less than 1 micron.

6. The process of claim 1, the mixture being passed through the nozzle repeatedly by recirculation.

7. The process of claim 1, the filler particles containing an electrically conductive particle selected from the group consisting of metals, alloys, metal on metal composites, and metal on nonmetal composites, conductive oxides, conductive polymers, carbons, and combinations thereof.

8. The process of claim 1, the filler particles containing an electrically non-conductive particle selected from the group consisting of metal oxides, metal nitride, metal carbides, metal silicates, metal titanates, glasses, and combinations thereof.

9. The process of claim 1, the resin being selected from the group consisting of polyesters, polyurethanes, polyamides, phenoxy resins, vinyl-containing resins, epoxies, acrylics and acrylates, maleimides, and cyanate esters, silicones, and combinations thereof.

10. The process of claim 1, the filler particles containing at least one particle selected from the group consisting of silver, gold, platinum, copper, nickel, aluminum, gold coated nickel, silver coated nickel, silver coated aluminum, metallic coated glass spheres, nano silver particles, nano copper particles, nano nickel particles, nano-silver coated particles, graphite-coated particles, carbon nanotubes, conductive oxides, and combinations thereof.

11. The process of claim 1, further comprising combining additional filler particles to the dispersed particle mixture and recirculating the dispersed particle mixture containing the additional filler particles through the nozzle.

12. The process of claim 1, A being greater than 800,000 m/sec$^2$.

13. The process of claim 1, the average diameter of the filler particles of step a) being reduced at least 85 percent after passing through the nozzle.

14. The process of claim 1, the average diameter of the filler particles of step a) being reduced at least 90 percent after passing through the nozzle.

15. The process of claim 1, the average diameter of the filler particles of step a) being in the range of 5 microns to 500 microns before passing through the nozzle.

* * * * *